(12) United States Patent
Yaniv et al.

(10) Patent No.: US 7,300,634 B2
(45) Date of Patent: Nov. 27, 2007

(54) PHOTOCATALYTIC PROCESS

(75) Inventors: Zvi Yaniv, Austin, TX (US); Richard Lee Fink, Austin, TX (US)

(73) Assignee: Nano-Proprietary, Inc., Austin, TX (US)

( * ) Notice: Subject to any disclaimer, the term of this patent is extended or adjusted under 35 U.S.C. 154(b) by 0 days.

(21) Appl. No.: 11/263,638

(22) Filed: Oct. 31, 2005

(65) Prior Publication Data

US 2006/0090996 A1    May 4, 2006

Related U.S. Application Data

(60) Provisional application No. 60/624,724, filed on Nov. 3, 2004.

(51) Int. Cl.
*B01J 19/08* (2006.01)

(52) U.S. Cl. .................. 422/186.3; 422/121; 422/22

(58) Field of Classification Search ............. 422/186.3, 422/121, 22
See application file for complete search history.

(56) References Cited

U.S. PATENT DOCUMENTS 5,600,200 A    2/1997  Kumar et al. ........... 313/346 R
6,761,859 B1 *  7/2004  Oda ........................ 422/186.3
2002/0070648 A1 *  6/2002  Forsberg ..................... 313/309

FOREIGN PATENT DOCUMENTS

WO    WO 2004/026471    1/2004

OTHER PUBLICATIONS

Bonard et al., "Field Emission From Cylindrical Carbon Nanotube Cathodes : Possibilities For Luminescent Tubes", Applied Physics Letters, vol. 78, No. 18, Apr. 30, 2001, pp. 2775-2777.*
Croci et al., "A Fully Sealed Luminescent Tube Based on Carbon Nanotube Field Emission", Microelectronics Journal, vol. 35, Issue 4, Apr. 2004, pp. 329-336.*
Takeshi Kudo et al., "Development of Rectangular Column Structured Titanium Oxide Photocatalysts Anchored on Silica Sheets," Res. Chem. Intermed, vol. 29, No. 6, pp. 631-639 (2003).

* cited by examiner

*Primary Examiner*—Kishor Mayekar
(74) *Attorney, Agent, or Firm*—Fish & Richardson P.C.; Kelly Kordzik

(57) ABSTRACT

A photocatalytic cleaner for air or water includes a photocatalytic material coating a substrate. An anode, positioned a predetermined distance from the substrate, includes a phosphor that emits ultraviolet light in response to bombardment by electrons from a field emission cathode emitting electrons in response to an electric field. The field emission cathode may be a carbon based field emitter material including incorporating carbon nanotubes.

17 Claims, 3 Drawing Sheets

PHOTOCATALYTIC PROCESS

This application claims priority to U.S. Provisional Patent Application Ser. No. 60/624,724 filed Nov. 3, 2004.

TECHNICAL FIELD

The present invention relates in general to photocatalytic cleaners, and in particular, to a field emission device for implementing a photocatalytic air or water cleaner.

BACKGROUND INFORMATION

Titanium oxide has been used as a photocatalyst for many different applications. One of the most studied applications is for solar cell applications. There are many other applications that are already used in products. Titanium dioxide ($TiO_2$) is used to absorb ultraviolet (UV) rays in sun screen lotions. $TiO_2$ is also used to clean water and air in purification systems. The $TiO_2$ works by creating free radicals and charged particles that will react with bio and viral contaminants and noxious chemicals near the activated $TiO_2$, thus decomposing these contaminants into harmless compounds.

In these purification systems, a UV light source is required to activate the $TiO_2$ material. The photocatalytic behavior is best if the wavelength of the UV light used is shorter than 380 nm. Typically, a fluorescent lamp (sometimes called an inverter lamp) is used as the UV light source. There are several problems with these UV light sources. They often contain mercury and are thus toxic to the environment and to humans since they are often disposed in a landfill. Mercury lamps also take some time to switch ON to full power, i.e., they have a warm-up period. If the lamps break in the home air system or water supply, they will contaminate these systems with toxic mercury. Further, the life of these systems is limited and the intensity of the UV light is weak, thus limiting the usefulness of the decontamination or cleaning system using the $TiO_2$ photocatalyst.

Another source of UV light is using wide bandgap LEDs (light emitting diodes). Although LEDs have longer lifetimes and are instant ON, they are not efficient and do not illuminate uniformly.

What is needed is a large area UV light source that is instant ON, does not contain mercury, has high brightness, is highly efficient and has long lifetimes.

Furthermore, the $TiO_2$ is currently deposited on the UV lamp surface or on a fiberglass cloth. The fiberglass cloth is needed because the $TiO_2$ deposition requires high temperatures to achieve the best photocatylitic properties of the $TiO_2$. This material is not conductive and may not be robust. What is needed is a cloth or fiber material on which to deposit the $TiO_2$, which is conductive and able to withstand high temperatures.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
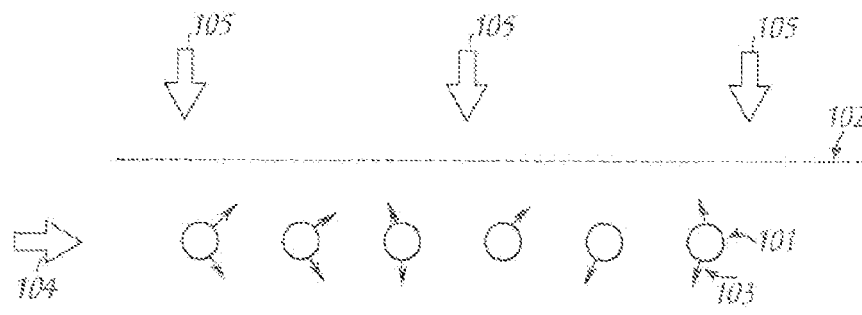
FIG. 1 illustrates a diagram of an air purification system using $TiO_2$ and an ultraviolet light source.

In the following description, numerous specific details are set forth such as specific network configurations, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates a configuration of an air purification system using $TiO_2$ and a UV lightsource. UV fluorescent lamps 101, or inverter lamps, are positioned to emit UV light 103 from each of the lamps 101. Filters 102 with a $TiO_2$ coating on the inside surface of the filter facing the UV lamps 101 can be made of carbon cloth or paper as described below. A flow of unclean air 105 is passed through the cleaner resulting in a flow of clean air 106 emanating from the cleaner. In another configuration, the unclean air can be passed sideways 104 between the $TiO_2$ coated sheets 102. In such a case, the sheets 102 do not need to be porous to air.

A water purification system can be configured to be very similar. Not shown in this diagram are fans or pumps to move the air or water, and the walls, pipes or ducting to move or transport the flow to specific areas. Further, not shown are power supplies and connectors needed to operate the lamps. One skilled in the art would be able to implement such items not shown.

Figure 2:
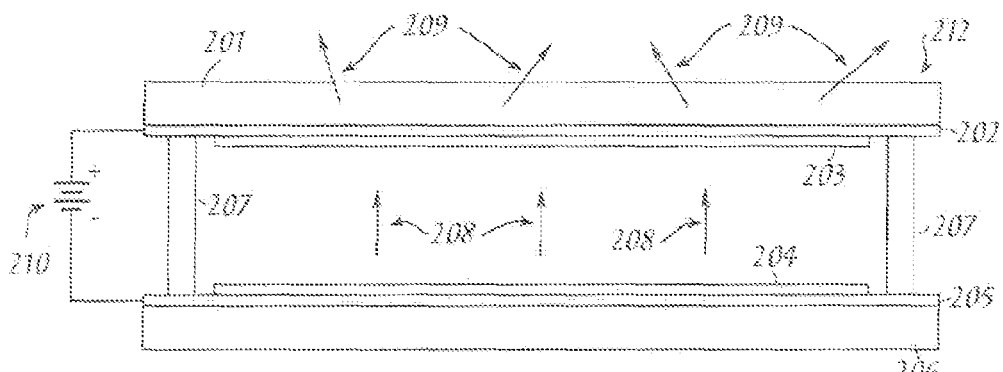
FIG. 2 illustrates a diode configuration of a UV lamp using a cold cathode and a UV emitting phosphor in accordance with an embodiment of the present invention.

FIG. 2 illustrates a lamp 200 that uses an electron beam stimulated phosphor to generate UV light. The electron beam 208 is created using a cold cathode 211, such as a carbon-based cold cathode; and more specifically, the use of a carbon nanotube electron source 204. This lamp 200 has several advantages:

1. It does not contain mercury,
2. It is instant ON,
3. It generates a high UV light intensity with high efficiency, and
4. It has a long lifetime (greater than 20,000 hours).

There are several configurations in which to make this lamp 200. One embodiment is to make this lamp 200 in what is a diode configuration as shown in FIG. 2. In this configuration, the electron source 204 faces an anode 212 that is coated with a phosphor 203, which generates UV light 209 when struck by energetic electrons 208.

The cathode 211 comprises a glass substrate 206 with a layer of electrically conducting material 205 deposited on the surface of the glass 206. The conducting material 205 can be a metal film such as chromium, copper, titanium or other metal, an alloy or mixture of these metals, or a screen printed paste that is conducting when cured properly such as Dupont #7713 Ag paste. The conducting layer 205 can also be indium tin oxide (ITO) or other transparent conducting material.

On top of the conducting layer 205 is deposited a layer of cold cathode material 204, which emits electrons 208 when an electrical bias 210 is applied to the surface of the cold cathode material 204 strong enough to pull the electrons 208 from the material 204. There are many materials from which to choose, including metal micro tips or silicon or carbon microtips, but one embodiment uses a carbon-based cold cathode, such as a film containing carbon nanotubes (CNTs). The CNT film 204 can be grown on the surface of the conductor 205 using one of many CVD techniques already known in the state of the art (thermal CVD, plasma CVD, hot filament CVD, etc.) using a transition metal as a catalyst to promote CNT growth. The CNT film 204 can also be dispensed or deposited on the surface 205 using spraying, printing, screen printing, dispensing, painting, dipping, ink jet printing, spin coating or other means of putting an ink or paste containing CNTs on the surface. The CNTs can also be deposited using a dry spray process or by a bead blasting process. A resistive layer (not shown) may be placed between the cathode conductor 205 and the CNT layer 204. It is also possible that the cathode conducting layer 205 and the CNT layer 204 are the same material and there is only one layer. The CNT layer 204 and the conducting layer 205 may be continuous or patterned. The CNT layer 204 may be pixilated.

Figure 5:
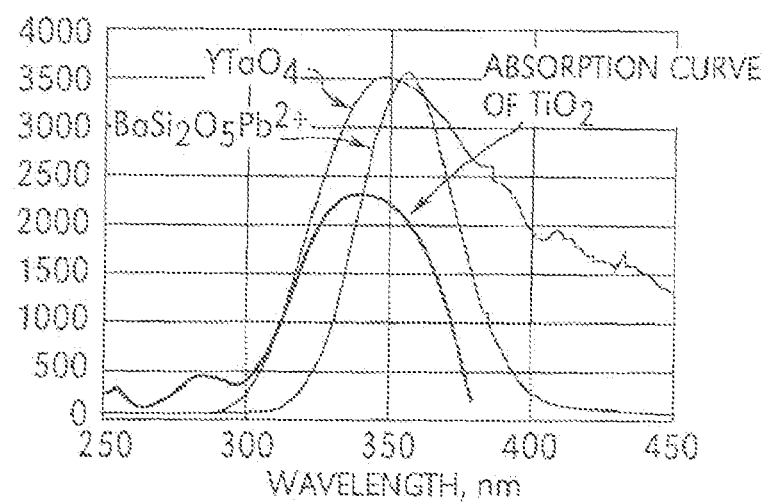
FIG. 5 illustrates a graph of phosphor intensities.

On the anode 212, a glass substrate 201 is coated with a conducting 203 and transparent layer of material 202, such as ITO. On top of this ITO surface 202 is a phosphor material 203 that will emit UV light when struck by energetic electrons 208. The ITO layer 202 is deposited by techniques well known in the art, such as evaporation, sputtering, etc. Examples of the phosphor material 203 are YTaO4, YTaO4:Gd, $BaSi_2O_5:PB^{2+}$ and ZrP2O4. Other materials may work as well. The choice of phosphor material is determined by the efficiency of the phosphor (how much light is emitted per unit of electron energy hitting the phosphor), the emission wavelength distribution (there is a good overlap of the emission wavelength with the absorption band of the $TiO_2$ or any other photocatalyst or process of interest), the lifetime of the phosphor (does it age slowly), saturation limits and decay times (can the lamp be driven to high luminous intensity) as well as cost and vacuum compatibility. Lamps have been made using the $BaSi_2O_5:PB^{2+}$ phosphor and the $YTaO_4$ phosphor. For $TiO_2$ photocatalyst applications, the $YTaO_4$ phosphor may be a better selection, as it UV emission band overlap is stronger with the $TiO_2$ absorption band (see FIG. 5). Other phosphors may be chosen for other photocatalytic applications or for other UV lamp applications, such as curing photo resist materials or hardening or setting polymers.

The phosphor material 203 is deposited using electrophoresis, screen printing, settling, drying, or other methods. An aluminum layer (not shown) may be deposited on top of the phosphor layer 203 such that electrons penetrate through the aluminum layer before striking the phosphor layer 203. The aluminum layer is thin enough to allow the electrons 208 from the cathode 211 to penetrate through it, but thick enough to allow the UV light 209 generated by the phosphor 203 to be reflected back. The aluminum layer acts to increase the efficiency and the luminous intensity (brightness) of the phosphor. The phosphor material emits light in all directions. If a reflective layer is placed behind the phosphor layer, then light going in the direction of the cathode from the phosphor is reflected back to the forward direction, essentially doubling the light output of the lamp.

Figure 6:
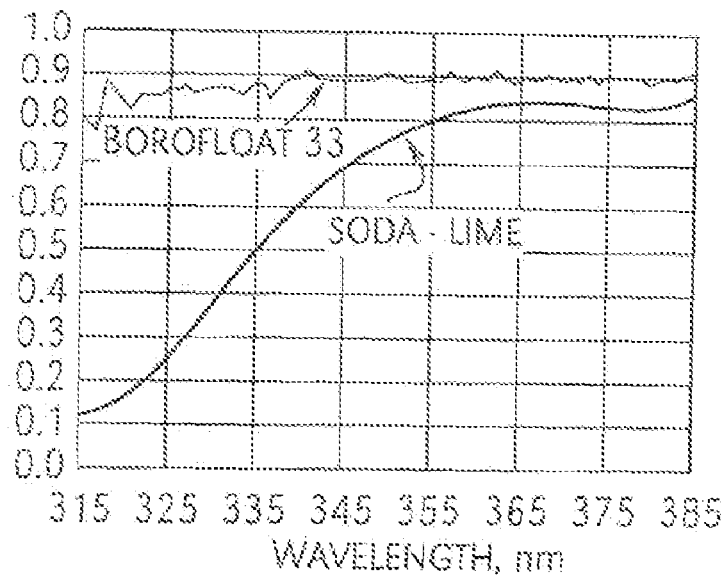
FIG. 6 illustrates a graph of glass transparency in the UV range.

The anode glass substrate material should be transparent to the UV light as much as possible. Although soda lime glass materials have some transmission of UV light, borosilicate glass has an even higher transmission of UV light. An example of UV transmissive glass is Borofloat 33 made by Shott Glass. It has a short wavelength cut-off that extends further into the UV than does soda lime glass (see FIG. 6). There are other materials that have even higher transmission in the UV; examples include even harder borosilicate glasses and quartz. The choice of glass is also determined by an ability to assemble a sealed device. One approach of the present invention may require the use of glass-to-glass frit seals. For example, glass frit materials already exist for the Shott Borofloat Glass. Using other assembly techniques, such as using glass tubes and using a flame seal process may allow other glass choices such as quartz. The choice of glass for the anode may determine the choice of glass for the rest of the system (cathode, sidewalls, etc.) since they may need to have matching thermal coefficients. This maintains stress in the glass parts to a minimum during the sealing and assembly processes, which may require temperatures as high as 550° C.

The anode 212 and cathode 211 plates may be assembled together with sidewalls 207 and sealed using glass frits to make a sealed glass bulb. The active sides of the anode 212 and cathode 211 are facing each other in the assembly. The air in the bulb is evacuated through a hole or tube (not shown) and the hole or tube is sealed after evacuation. Getters (not shown) may be used to pump the residual air in the bulb. If the bulb is large enough and the glass plates are too thin to hold the gap between the anode 212 and cathode 211 as a result of the external air pressure on the surface, spacers inside the bulb (not shown) may be used to support the glass plates.

The lamp 200 is operated by placing a negative bias 210 on the cathode conductor 205 and a positive bias 210 on the anode conductor 202. The bias 210 can be continuous (DC) or pulsed (AC). The bias 210 should be strong enough to generate an electric field of 1 V/micron-20 V/micron between the anode 202 and cathode 205 conductors such that electrons 208 are extracted from the CNT layer 204 and accelerated to the anode phosphor layer 203. The gap between the anode 212 and cathode 211 and the acceleration voltage used is dependent on the quality of the CNT material 204 used and the energy of electrons needed to activate the phosphor 203 efficiently. Typically, electron energies of 5000V or higher are needed to efficiently activate the phosphor. 10,000V is better. Above 10,000V-12,000V, the phosphor efficiency will be even higher, but x-ray light may also be generated, which may be harmful, and thus may need to be avoided. It may be possible to choose a glass material that blocks the x-ray light but allows the UV light to pass. In all cases, the glass 201 of the anode 212 allows the UV light 209 to pass through.

Figure 4:
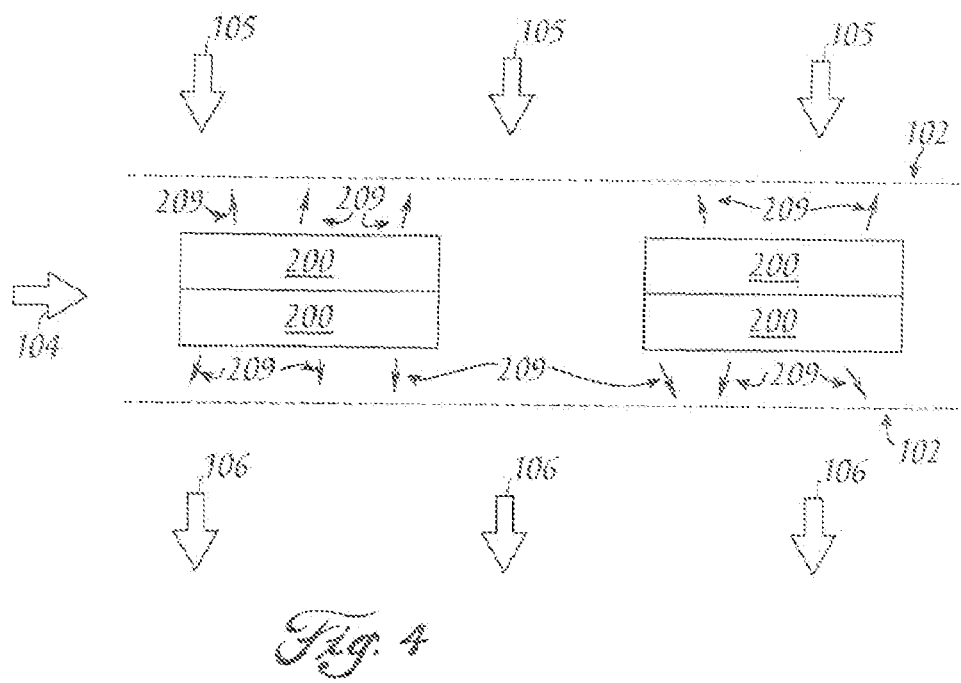
FIG. 4 illustrates an embodiment of the present invention.

In one embodiment, the light passes through the anode glass 201 as shown, but other configurations (not shown) may allow the light to pass through the cathode surface 206, and the anode surface is made reflective to pass as much light as possible through the cathode surface 206. In yet another configuration, both the UV light may pass through both the anode and the cathode substrates. In other words, UV light generated at the anode surface may be allowed to pass through both the anode and the cathode surfaces. FIG. 4 illustrates such an embodiment whereby the diode configuration lamp 200 is implemented in a cleaner, similar to the one shown in FIG. 1, except that back-to-back lamps 200 are positioned in place of the UV lamps 101. In other words, the back-to-back lamps comprise dual UV lamps 200 with their respective cathodes positioned back-to-back so that UV light 209 emanates towards the cleaner surfaces 102. Otherwise, the apparatus shown in FIG. 4 will operate similarly to the one illustrated in FIG. 1.

The UV emitting phosphor 203 may be continuous on the anode surface or it may be pixilated into separate patches or into a pattern. The pattern may or may not match any pattern made in the cathode.

The previous description was of a diode lamp. In another embodiment a triode lamp may be used. A triode lamp is similar to a diode lamp but has one or more electrodes to control the electron emission current separate from the anode acceleration voltage. One triode configuration may have a metal mesh and perforated metal screen that is placed close to the cathode between the cathode and anode. This metal mesh is bias positive with respect to the cathode with enough voltage such that it sets up the electric field at the cathode strong enough to pull electrons from the carbon nanotubes emitters. The bias is dependent on the gap between the cathode and the metal mesh, but a nominal field strength of 1 V/micron to 20 V/micron is often sufficient of field strength. Some of the electrons extracted from the cathode then pass through the holes in the metal mesh and are accelerated to the anode by the anode potential (typically 5000 V to 20,000 V as in the diode lamp, although other voltages may be used.

Other triode configurations may have the gate electrode above and to the side of the cathode. In this configuration, the gate electrode may be a metal film or printed metal layer. The gate electrode behaves much the same as in the metal mesh triode configuration. This configuration may require more potential on the gate, but it may intercept a smaller amount of the cathode emission current and thus be more efficient. Use of gate electrodes in field emission devices is well known.

Still another triode configuration is a mixture of the diode and triode configurations, in which the cathode lines are interdigitated. In this case, the two cathode lines are driven with a sinusoidal voltage; in one-half of the cycle one set of lines acts as the cathode, and the other set of lines acts as the grid; in the other half of the cycle, the roles are reversed between the two sets of lines. A strong electric field provided by the potential on the anode is desired; the anode field should be near the threshold field of the carbon nanotubes emitters deposited on the two sets of lines.

In some embodiments, the lamp may require cooling. The lamp may be cooled with a flow of air forced across it by a fan (not shown). In other embodiments, the lamp may be cooled by contacting the lamp with a thermal conductor to transport the heat away. The thermal conductor may have fins or other large surface area structures to help move the heat away by convection or forced air. The air or water that is being cleaned by the photocatalyst in the case of an air cleaner or water cleaner may also provide cooling to the lamp.

Figure 3:
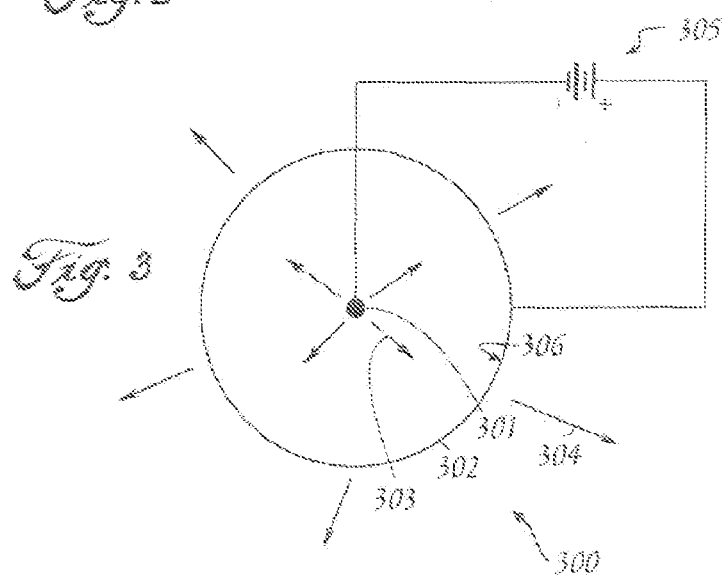
FIG. 3 illustrates a field emission lamp in a tube bulb configuration in accordance with an embodiment of the present invention.

FIG. 3 illustrates a field emission lamp 300 in a tube bulb configuration. The outer glass bulb 302 can be conducting or it may be coated with a conducting film 306 on the inside surface to carry the charge away to the power supply 305. The power supply 305 may be AC or DC. Not shown are the ends of the bulb to make a sealed bulb that is evacuated of air to levels on the order of $10^{-5}$ Torr or better. The phosphor coating 306 may be aluminized as described earlier (not shown in this figure). A center pin conducting cathode 301 with an outer surface coated with CNTs or another field emission material emits electrons 303 to an inner surface 306 of the glass bulb 302. The inner surface 306 comprises a UV emitting phosphor, which generates UV light 304 as a result of the electrons 303 striking the prosper 306. The power supply 305 provides a bias between the center pin cathode 301 and the outer bulb anode 302.

Another embodiment of the present invention uses carbon fibers or carbon cloth to deposit or grow the $TiO_2$ photocatalytic material. The carbon fiber material can be pitch based or PAN based carbon fiber or single wall or multiwall carbon nanotube material. The carbon fibers can further be woven into a cloth or a mat, or paper of carbon fiber material can be used. The $TiO_2$ can be deposited on the fiber either before or after the making the cloth or paper. The cloth or paper can be porous to allow air or water to pass through. Different varieties of carbon fiber cloths are available from various vendors, such as Cytec. The cloth could also be a paper of chopped carbon fibers or carbon nanotubes. It may not even be completely carbon but could also be partially carbon material, including graphite, carbon fiber, carbon nanotubes, carbon particles and graphite, and partially other materials such as glass fiber. FIG. 1 shows how this cloth can be used as material 102. The carbon surface may need to be passivated in order to prevent the $TiO_2$ from etching it away when activated by UV light 103. This passivation layer may be conducting, semiconducting or insulating. One possible example would be the use of Ti metal on the surface of the carbon.

Although the present invention and its advantages have been described in detail, it should be understood that various changes, substitutions and alterations can be made herein without departing from the spirit and scope of the invention as defined by the appended claims.

What is claimed is:

1. A photocatalytic cleaner for air or water, comprising:
   a photocatalytic material coating a substrate;
   an anode, positioned a predetermined distance from the substrate, comprising a phosphor adapted to emit ultraviolet light in response to bombardment by electrons; and
   a field emission cathode, positioned a predetermined distance from the anode, operable for emitting electrons in response to an electric field.

2. The photocatalytic cleaner as recited in claim 1, wherein the field emission cathode further comprises a carbon based field emitter material to emit the electrons.

3. The photocatalytic cleaner as recited in claim 2, wherein the carbon based field emitter material comprises carbon nanotubes.

4. The photocatalytic cleaner as recited in claim 3, wherein the field emission cathode and anode are positioned relative to each other in a diode lamp configuration.

5. The photocatalytic cleaner as recited in claim 4, wherein the diode lamp configuration results in a rectangular-shaped lamp.

6. The photocatalytic cleaner as recited in claim 4, wherein the diode lamp configuration results in a cylindrically shaped lamp.

7. The photocatalytic cleaner as recited in claim 3, wherein the field emission cathode and anode are positioned relative to each other in a triode lamp configuration.

8. A photocatalytic apparatus comprising:
   a photocatalytic material;
   an anode, positioned a predetermined distance from the photocatalytic material, comprising a phosphor adapted to emit ultraviolet light in response to bombardment by electrons; and a field emission cathode, positioned a predetermined distance from the anode, operable for emitting electrons in response to an electric field towards the phosphor.

9. The photocatalytic apparatus as recited in claim 8, wherein the field emission cathode further comprises a carbon based field emitter material to emit the electrons.

10. The photocatalytic apparatus as recited in claim 9, wherein the carbon based field emitter material comprises carbon nanotubes.

11. The photocatalytic apparatus as recited in claim 8, wherein the field emission cathode and anode are positioned relative to each other in a diode lamp configuration.

12. The photocatalytic apparatus as recited in claim 8, wherein the field emission cathode and anode are positioned relative to each other in a triode lamp configuration.

13. The photocatalytic apparatus as recited in claim 12, wherein the triode lamp configuration results in a rectangular-shaped lamp.

14. The photocatalytic apparatus as recited in claim 12, wherein the triode lamp configuration results in a cylindrically shaped lamp.

15. A method for cleaning a fluid comprising:
    activating a field emitter with an electric field so that the field emitter emits electrons towards a phosphor;
    the phosphor emitting ultraviolet light in response to bombardment by the electrons emitted by the field emitter;
    a photocatalytic material activated by bombardment by the ultraviolet light emitted by the phosphor; and
    passing the fluid in contact with the photocatalytic material.

16. The method as recited in claim 15, wherein the field emitter comprises a carbon based field emitter.

17. The method as recited in claim 16, wherein the carbon based field emitter comprises carbon nanotubes.

* * * * *